United States Patent
Campbell et al.

(10) Patent No.: US 12,316,081 B2
(45) Date of Patent: May 27, 2025

(54) METHOD AND SYSTEM FOR PREPARING A TERMINAL FOR AN INSULATED WIRE CONDUCTOR

(71) Applicant: GM GLOBAL TECHNOLOGY OPERATIONS LLC, Detroit, MI (US)

(72) Inventors: John D. Campbell, Rochester Hills, MI (US); Elizabeth Pepper, Royal Oak, MI (US); Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 22 days.

(21) Appl. No.: 18/164,078

(22) Filed: Feb. 3, 2023

(65) Prior Publication Data

US 2024/0266812 A1    Aug. 8, 2024

(51) Int. Cl.
*H02G 1/12* (2006.01)
*H01B 3/08* (2006.01)
*H01B 7/00* (2006.01)

(52) U.S. Cl.
CPC ............. *H02G 1/128* (2013.01); *H01B 3/081* (2013.01); *H01B 7/0009* (2013.01); *H02G 1/1285* (2013.01)

(58) Field of Classification Search
CPC ...... H02G 1/128; H02G 1/1285; H01B 3/081; H01B 7/0009
See application file for complete search history.

(56) References Cited

U.S. PATENT DOCUMENTS

| | | | | |
|---|---|---|---|---|
| 3,786,224 A | * | 1/1974 | Heywang | B23K 26/40 269/57 |
| 3,953,706 A | * | 4/1976 | Harris | H02G 1/128 219/121.68 |
| 4,970,367 A | * | 11/1990 | Miller | B23K 26/40 219/121.68 |
| 5,522,130 A | * | 6/1996 | Wollermann | B26D 5/34 29/33 F |
| 5,837,961 A | * | 11/1998 | Miller | B23K 26/067 219/121.79 |

(Continued)

FOREIGN PATENT DOCUMENTS

| | | | | |
|---|---|---|---|---|
| DE | 10146720 A1 | * | 12/2002 | ............ H01B 7/0018 |
| DE | 102013006361 A1 | * | 4/2014 | ............ H01R 43/28 |

(Continued)

*Primary Examiner* — Jeffrey T Carley
*Assistant Examiner* — Jose K Abraham
(74) *Attorney, Agent, or Firm* — Quinn IP Law

(57) ABSTRACT

An exposed terminal for a wire conductor, and a process for preparing the exposed terminal includes executing, via a mechanical device, a mechanical ablation process to remove the insulative material from an outer surface of the plurality of square edges along a predefined length of the portion of the wire conductor. The process also includes executing, via a laser tool, a laser ablation process to remove the insulative material from the first pair of opposed faces along the predefined length of the portion of the wire conductor; and executing, via the laser tool, the laser ablation process to remove the insulative material from the second pair of opposed faces along the predefined length of the portion of the wire conductor.

18 Claims, 5 Drawing Sheets

(56) References Cited

U.S. PATENT DOCUMENTS

| | | | | |
|---|---|---|---|---|
| 5,935,465 | A | * | 8/1999 | Cardineau ................ A61N 1/05 |
| | | | | 219/121.85 |
| 6,546,617 | B1 | * | 4/2003 | Hayashi ............... H02G 1/1251 |
| | | | | 29/877 |
| 6,635,843 | B1 | * | 10/2003 | Takeda ................ B23K 11/061 |
| | | | | 219/91.21 |
| 6,865,796 | B1 | * | 3/2005 | Oohashi ................ H02K 15/30 |
| | | | | 242/432 |
| 2010/0201586 | A1 | * | 8/2010 | Michalk ............... H02G 1/1248 |
| | | | | 343/741 |
| 2016/0233652 | A1 | * | 8/2016 | Goto .................... H01B 7/0009 |
| 2018/0083428 | A1 | * | 3/2018 | Shigematsu ......... H02G 1/1285 |
| 2019/0057796 | A1 | * | 2/2019 | Barron .................... H01L 24/85 |
| 2022/0102950 | A1 | * | 3/2022 | Atsumi .................. H01F 41/04 |
| 2024/0079862 | A1 | * | 3/2024 | Ushida ................ B23K 26/351 |

FOREIGN PATENT DOCUMENTS

| | | | | | |
|---|---|---|---|---|---|
| DE | 102019209665 | A1 | * | 1/2021 | ............. H02G 1/128 |
| DE | 102020211706 | A1 | * | 9/2021 | |
| EP | 1228834 | A1 | * | 8/2002 | ........... B23K 26/035 |
| JP | 2007322369 | A | * | 12/2007 | |
| JP | 2022045093 | A | * | 3/2022 | |

* cited by examiner

METHOD AND SYSTEM FOR PREPARING A TERMINAL FOR AN INSULATED WIRE CONDUCTOR

INTRODUCTION

Insulated wire conductors, including those employed on stators of electric motors, have terminal portions that are stripped of insulative material and then welded to other wire conductors to form electrical and mechanical connections. When employed on a stator of an electric motor, the interconnected insulated wire conductors are supplied electrical power from an inverter to generate rotating electromagnetic fields that are able to urge rotation of a rotor that is proximal thereto. There is a need for improved processes to remove insulation from portions of the wire conductors to facilitate welding.

SUMMARY

The concepts described herein provide a process and product that employ multiple ablation processes within one process step to remove insulation, e.g., enamel, from a terminal of a wire conductor, and shape the terminal of the wire conductor. The ablation processes advantageously include laser ablation and mechanical ablation, which are employed to remove the enamel insulation.

An aspect of the disclosure may include a process for preparing an exposed terminal for a wire conductor that includes inserting a portion of the wire conductor into a fixture, wherein the wire conductor includes an elongated conductive element encased in an insulative material, wherein the elongated conductive element has a rectangular cross-section including a first pair of opposed faces and a second pair of opposed faces, and wherein a plurality of square edges are disposed at adjacent ones of the first pair of opposed faces and a second pair of opposed faces. This includes executing, via a mechanical device, a mechanical ablation process to remove the insulative material from an outer surface of the plurality of square edges along a predefined length of the portion of the wire conductor. The process also includes executing, via a laser tool, a laser ablation process to remove the insulative material from the first pair of opposed faces along the predefined length of the portion of the wire conductor; and executing, via the laser tool, the laser ablation process to remove the insulative material from the second pair of opposed faces along the predefined length of the portion of the wire conductor.

Another aspect of the disclosure may include straightening the portion of the wire conductor prior to inserting the portion of the wire conductor into the fixture.

Another aspect of the disclosure may include the insulative material that is removed being an enamel coating.

Another aspect of the disclosure may include the mechanical device being a strip die, and wherein executing, via the mechanical device, the mechanical ablation process includes executing a strip die operation to remove the insulative material from the outer surface of the plurality of square edges along the predefined length of the portion of the wire conductor.

Another aspect of the disclosure may include the mechanical device being an edge forming tool, and wherein executing, via the mechanical device, the mechanical ablation process includes operating the edge forming tool to remove the insulative material from the outer surface of the plurality of square edges along the predefined length of the portion of the wire conductor.

Another aspect of the disclosure may include the edge forming tool being a rotatable bevel device; and wherein executing, via the mechanical device, the mechanical ablation process further includes operating the rotatable bevel device at an angle in relation to the plurality of square edges to remove the insulative material from the outer surface of the plurality of square edges along the predefined length of the portion of the wire conductor and to transform the plurality of square edges to beveled edges.

Another aspect of the disclosure may include the edge forming tool being a rotatable chamfer device; and wherein executing, via the mechanical device, the mechanical ablation process further includes operating the rotatable chamfer device to remove the insulative material from the outer surface of the plurality of square edges along the predefined length of the portion of the wire conductor and to transform the plurality of square edges to chamfered edges.

Another aspect of the disclosure may include executing, via the laser tool, the laser ablation process to remove the insulative material from the first pair of opposed faces along the predefined length of the portion of the wire conductor by focusing the laser tool to operate on the first pair of opposed faces of the elongated conductive element proximal to the insulative material along the predefined length of the portion of the wire conductor.

Another aspect of the disclosure may include executing, via the laser tool, the laser ablation process to remove the insulative material from the second pair of opposed faces along the predefined length of the portion of the wire conductor by focusing the laser tool to operate on the second pair of opposed faces of the elongated conductive element proximal to the insulative material along the predefined length of the portion of the wire conductor.

Another aspect of the disclosure may include executing, via the mechanical device, the mechanical ablation process to remove the insulative material from the outer surface of the plurality of square edges along the predefined length of the portion of the wire conductor; and then executing, via the laser tool, the laser ablation process to remove the insulative material from the first pair of opposed faces along the predefined length of the portion of the wire conductor.

Another aspect of the disclosure may include executing, via the laser tool, the laser ablation process to remove the insulative material from the first pair of opposed faces along the predefined length of the portion of the wire conductor; and then executing, via the mechanical device, the mechanical ablation process to remove the insulative material from the outer surface of the plurality of square edges along the predefined length of the portion of the wire conductor.

Another aspect of the disclosure may include a process for preparing a wire conductor that includes inserting a portion of the wire conductor into a fixture, wherein the wire conductor is an elongated conductive element encased in an insulative material, and having a substantially rectangular cross-section including a first pair of opposed faces and a second pair of opposed faces, and wherein a plurality of square edges are disposed at adjacent ones of the first pair of opposed faces and a second pair of opposed faces; executing, via a mechanical device, a mechanical ablation process to remove the insulative material from an outer surface of the plurality of square edges along a predefined length of the portion of the wire conductor; executing, via the mechanical device, the mechanical ablation process to remove the insulative material from the first pair of opposed faces along the predefined length of the portion of the wire conductor; and executing, via the laser tool, a laser ablation process to remove the insulative material from the second pair of opposed faces along the predefined length of the portion of the wire conductor.

Another aspect of the disclosure may include a wire conductor that includes an elongated conductive element encased in enamel; wherein the elongated conductive element has a substantially rectangular cross-section including a first pair of opposed faces and a second pair of opposed faces; wherein a plurality of square edges are disposed at adjacent ones of the first pair of opposed faces and a second pair of opposed faces; wherein a portion of the elongated conductive element is subjected to a mechanical ablation process to remove the enamel from an outer surface of the plurality of square edges along a predefined length of the portion of the elongated conductive element; and wherein a portion of the first pair of opposed faces along the predefined length of the portion of the elongated conductive element is subjected to a laser ablation process to remove the enamel; and wherein a portion of the second pair of opposed faces along the predefined length of the portion of the elongated conductive element is subjected to the laser ablation process to remove the enamel.

Another aspect of the disclosure may include the elongated conductive element being fabricated from one of copper, a copper alloy, aluminum, or an aluminum alloy.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which:

FIG. 2-1 is a schematic drawing, in flowchart form, that is associated with an embodiment of a process for removing insulation and shaping a terminal of a wire conductor, in accordance with the disclosure.

FIGS. 2-2 and 2-3 are schematic end-views of an embodiment of a terminal of a wire conductor having insulation being removed and being shaped according to the process described with reference to FIG. 2-1.

FIG. 3-1 is a schematic drawing, in flowchart form, that is associated with another embodiment of the process for removing insulation and shaping a terminal of a wire conductor, in accordance with the disclosure.

FIGS. 3-2 and 3-3 are schematic end-views of an embodiment of a terminal of a wire conductor having insulation being removed and being shaped according to the process described with reference to FIG. 3-1.

FIG. 4-1 is a schematic drawing, in flowchart form, that is associated with another embodiment of the process for removing insulation and shaping a terminal of a wire conductor, in accordance with the disclosure.

FIGS. 4-2 and 4-3 are schematic end-views of an embodiment of a terminal of a wire conductor having insulation being removed and being shaped according to the process described with reference to FIG. 4-1.

Figure 1:
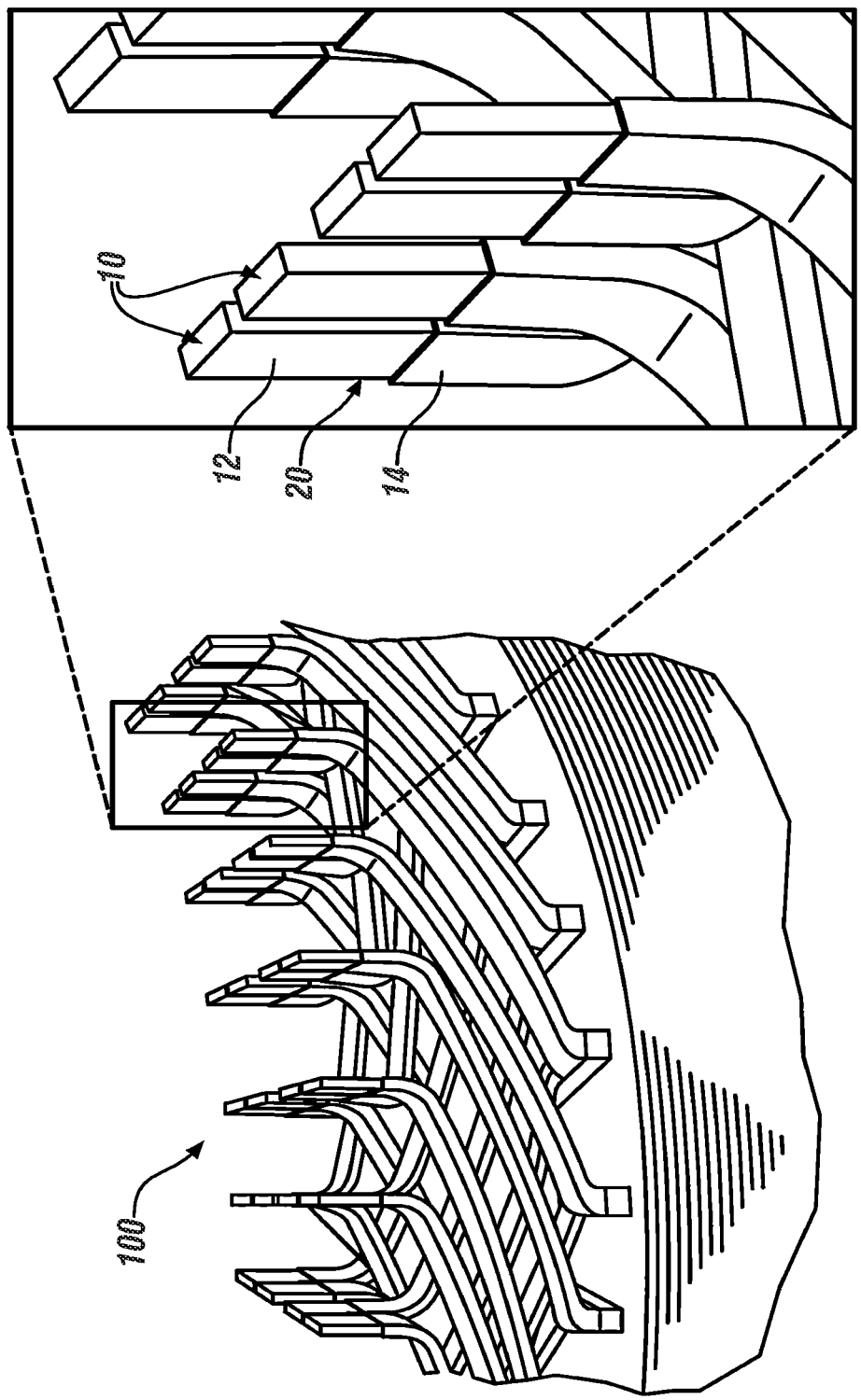
FIG. 1 is a schematic fragmentary isometric view of a stator assembly for an electric machine that includes a multiplicity of wire conductors, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by expressed or implied theories presented herein. Throughout the drawings, corresponding reference numerals indicate like or corresponding parts and features.

As used herein, the term "ablation" and related terms refers to the removal or destruction of material from an object by mechanical processes, electrical processes, chemical vaporization, or other processes.

The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIG. 1, consistent with embodiments disclosed herein, illustrates a portion of a stator assembly 100 for a rotary electric machine that includes a multiplicity of wire conductors 10. The rotary electric machine may be deployed on a vehicle or numerous other applications, without limitation. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The multiplicity of wire conductors 10 are arranged in slots formed in stacked steel elements of the stator assembly 100, with terminals 20 projecting outward.

Each of the wire conductors 10 is an insulated wire conductor that includes an elongated conductive element 12 that is encased in an insulative material 14, with an exposed terminal 20 being arranged on one end. The elongated conductive element 12 may be fabricated from one of copper, a copper alloy, aluminum, an aluminum alloy, or another electrically conductive material, without limitation. In one embodiment, the insulative material 14, such as enamel, is applied to the surface of the elongated conductive element 12 by an annealing process, wherein the elongated conductive element 12 is coated with a liquid form of the insulative material 14 at elevated temperature. In this manner, the wire conductor 10 is formed as an enamel coated conductor. Example materials for the insulative material 14 may include enamel in one embodiment, in the form of acetal, polyester, polyurethane, or a composite. Alternatively, the insulative material 14 may be another electrically insulative material, without limitation.

The remaining Figures schematically illustrate aspects and embodiments of an ablation process for removing insulative material 14 and shaping an embodiment of the exposed terminal 20 of the wire conductor 10. As shown in various ones of the Figures, the wire conductor 10 includes conductive element 12, insulative material 14, and terminal 20 that has an exposed portion 25 that is formed by the ablation process. In one embodiment and as illustrated, the conductive element 12 has a rectangular cross-section with first opposed faces 21 and second opposed faces 22. Junctions of the first and second opposed faces 21, 22 form and define a plurality of edges 24, wherein each of the plurality of edges 24 is a square edge or a slightly rounded square edge. The embodiments of the conductive element 12 are described as having rectangular cross-sections. It is appreciated that the concepts described herein may be applied to conductive elements having other cross-sections, e.g., triangular, pentagonal, hexagonal, octagonal, etc., without limitation, and with edges having angles that correspond to the cross-sectional shape of the conductive element 12.

Figure 5:
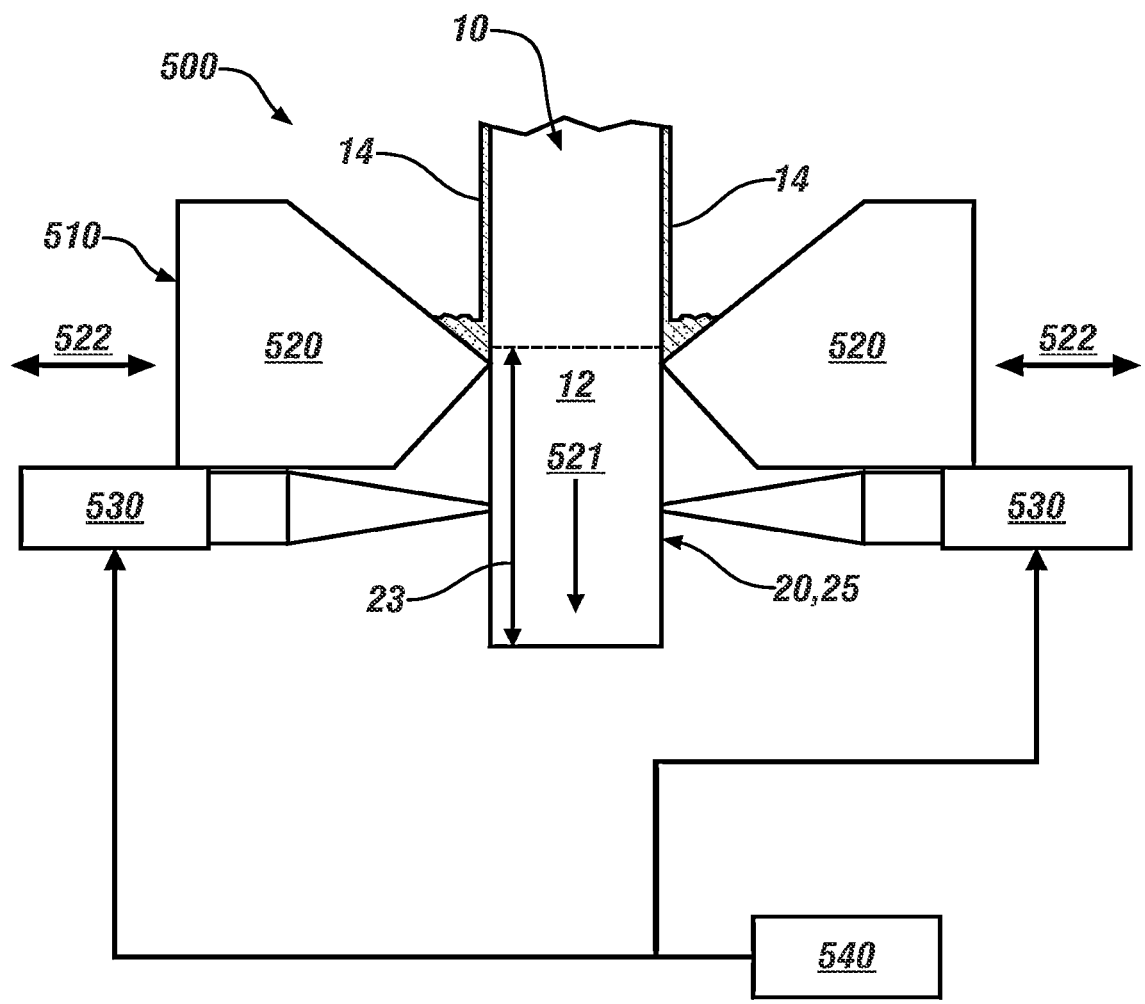
FIG. 5 schematically illustrates a process tool setup associated with an embodiment of a process for removing insulation and shaping a terminal of a wire conductor, in accordance with the disclosure.

FIG. 5 schematically illustrates a process tool setup 500 for removing insulative material 14 and shaping an embodiment of the exposed terminal 20 of the wire conductor 10. The process tool setup 500 includes a fixture 510, a mechanical ablation device 520, a laser ablation device 530, and a controller 540. The process tool setup 500 facilitates the utilization of multiple ablation methods, i.e., mechanical ablation and laser ablation, within one process step.

In one embodiment, the mechanical ablation device 520 is a strip die. In one embodiment, the mechanical ablation device 520 is an edge forming tool. In one embodiment, the edge forming tool of the mechanical ablation device 520 is a rotatable bevel device. In one embodiment, the edge forming tool mechanical ablation device 520 is a rotatable chamfer device. Exertion of horizontal motion and pressure of the mechanical ablation device 520 on the wire conductor 10 is indicated by 522, and exertion of vertical motion and/or pressure on the wire conductor 10 is indicated by 521.

Figures 1, 2:
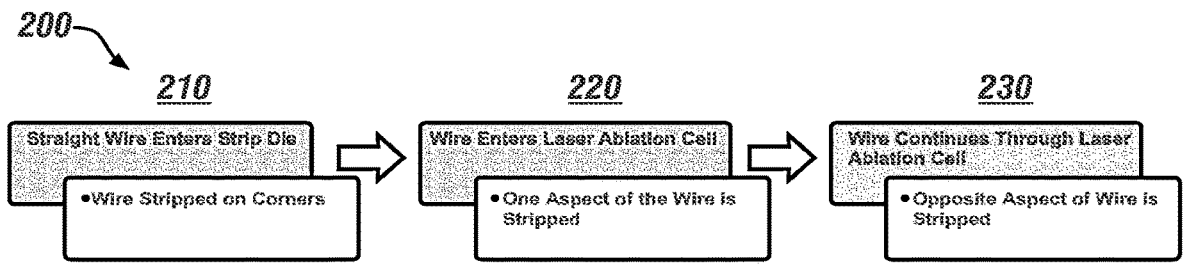
Figure 2:
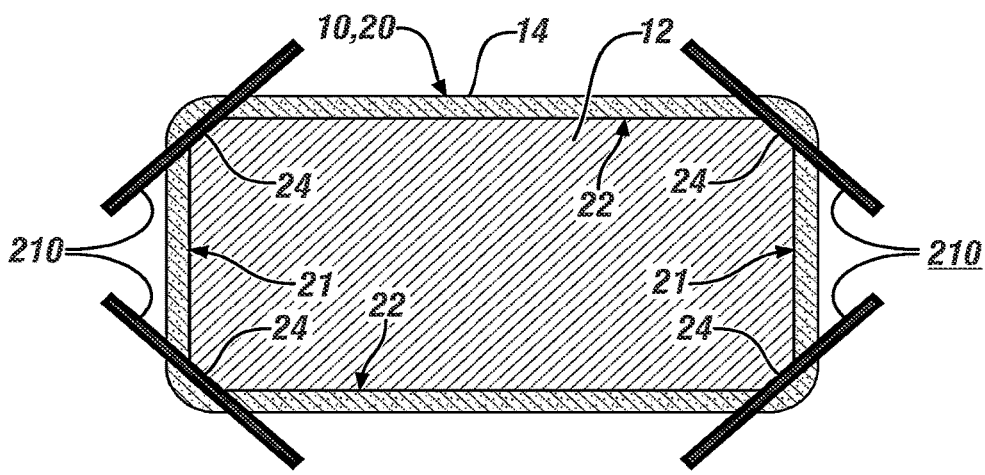
Figures 2, 3:
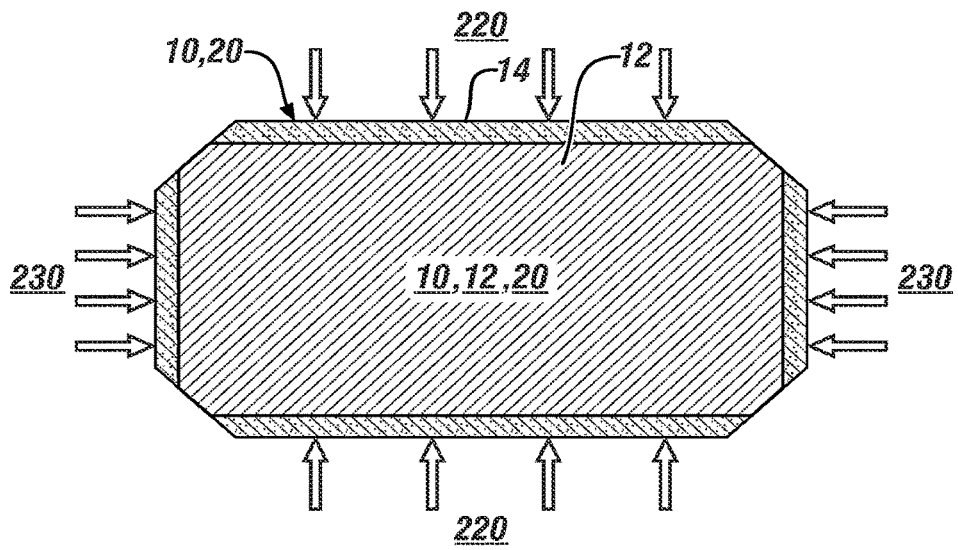
Figures 1, 3:
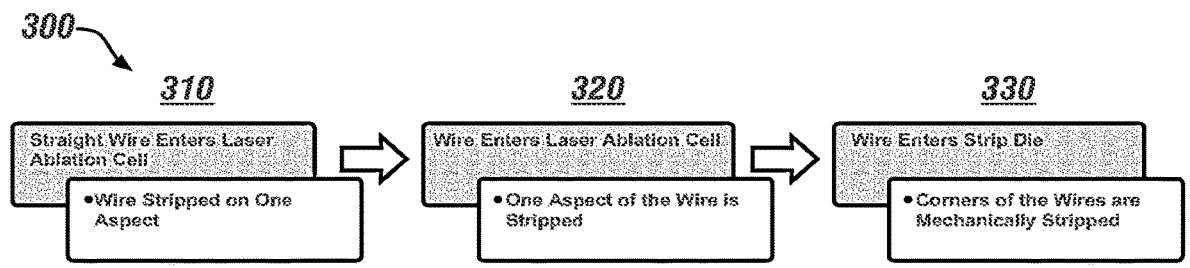
Figures 2, 3:
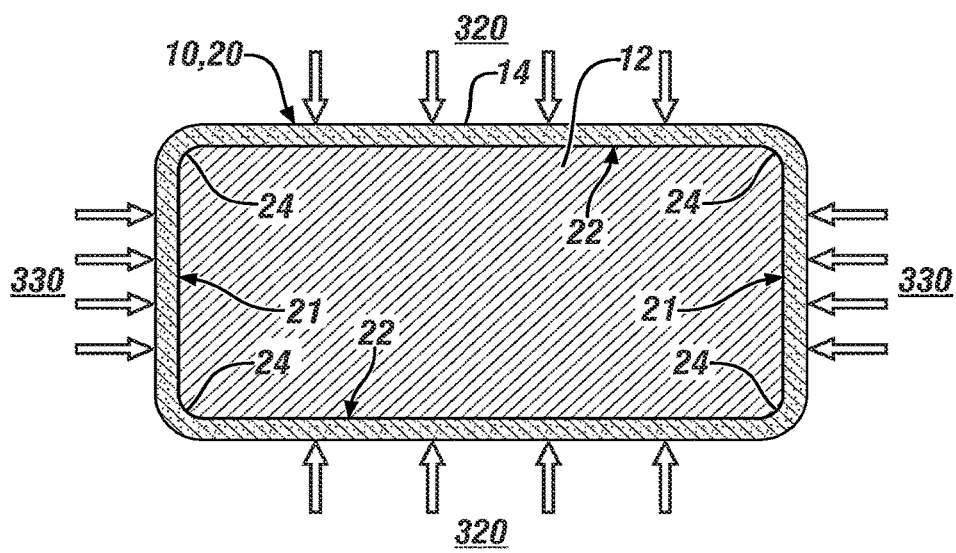
Figure 3:
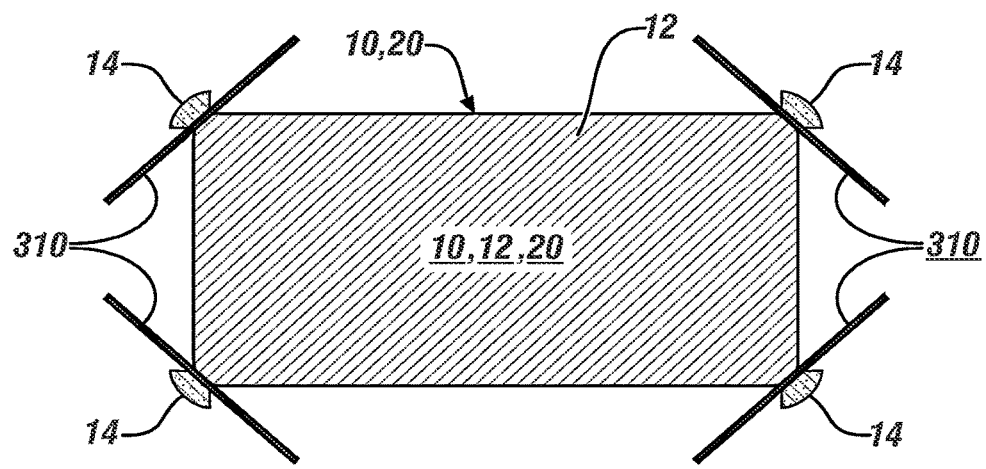

Referring now to FIGS. 2-1, 2-2, and 2-3, with continued reference to the process tool setup 500 described with reference to FIG. 5, an embodiment of an ablation process 200 for removing insulative material 14 and shaping an embodiment of the terminal 20 of the wire conductor 10 is depicted. An end portion of the conductive element 12 is inserted into a fixture 510. The mechanical ablation device 520 is employed to remove the insulative material 14 from an outer surface of the plurality of square edges 24 along a predefined length 23 of the portion of the wire conductor 10 (Step 210). The laser ablation device 530 is employed to remove the insulative material 14 from the first opposed faces 21 (Step 220) and to remove the insulative material 14 from the second opposed faces 22 (Step 230) along the predefined length 23 of the portion of the wire conductor 10.

The removal of the insulative material 14 from the outer surface of the plurality of square edges 24 along the predefined length 23 of the portion of the wire conductor 10 (Step 210) is illustrated with reference to FIG. 2-2.

When the mechanical ablation device 520 is a strip die, the mechanical ablation process includes executing a strip die operation with the mechanical ablation device 520 to remove the insulative material 14 from the outer surface of the plurality of square edges 24 along the predefined length 23 of the wire conductor 10.

When the mechanical ablation device 520 is an edge forming tool, the mechanical ablation process includes executing the mechanical ablation process by operating the edge forming tool to remove the insulative material from the outer surface of the plurality of square edges 24 along the predefined length 23 of the portion of the wire conductor 10.

When the edge forming tool of the mechanical ablation device 520 is a rotatable bevel device, executing the mechanical ablation process includes operating the rotatable bevel device at a predefined angle in relation to the plurality of square edges to remove the insulative material from the outer surface of the plurality of square edges along the predefined length 23 of the portion of the wire conductor 10 and to transform the plurality of square edges to beveled edges. The predefined angle of the beveled edges may be selected based upon design criteria associated follow-on process steps during assembly of the multiplicity of wire conductors 10 of the stator assembly 100 into the electric machine.

When the edge forming tool mechanical ablation device 520 is a rotatable chamfer device, executing the mechanical ablation process includes operating the rotatable chamfer device at a 45° angle in relation to the plurality of square edges to remove the insulative material from the outer surface of the plurality of square edges along the predefined length 23 of the portion of the wire conductor 10 and to transform the plurality of square edges to chamfered edges having a 45° angle in relation to the plurality of square edges.

The laser ablation device 530 is employed to remove the insulative material 14 from the first opposed faces 21 (Step 220) and to remove the insulative material 14 from the second opposed faces 22 (Step 230) along the predefined length 23 of the portion of the wire conductor 10. The laser ablation device 530 may be aimed at or near respective interfaces between the insulative material 14 and the first opposed faces 21, and at or near the respective interfaces between the insulative material 14 and the second opposed faces 22.

The removal of the insulative material 14 from the first opposed faces 21 and the second opposed faces 22 along the predefined length 23 of the portion of the wire conductor 10 (Steps 220, 230) is illustrated with reference to FIG. 2-3. In this manner, an exposed terminal 20 for the insulated conductive lead 10 may be prepared.

Referring now to FIGS. 3-1, 3-2, and 3-3, with continued reference to the process tool setup 500 described with reference to FIG. 5, another embodiment of an ablation process 300 for removing insulative material 14 and shaping an embodiment of the terminal 20 of the wire conductor 10 is depicted. An end portion of the conductive element 12 is inserted into a fixture 510.

The laser ablation device 530 is employed to remove the insulative material 14 from the first opposed faces 21 (Step 310) and to remove the insulative material 14 from the second opposed faces 22 (Step 320) along the predefined length 23 of the portion of the wire conductor 10. The mechanical ablation device 520 is then employed to remove the insulative material 14 from an outer surface of the plurality of square edges 24 along a predefined length 23 of the portion of the wire conductor 10 (Step 330).

The laser ablation device 530 is employed to remove the insulative material 14 from the first opposed faces 21 (Step 310) and to remove the insulative material 14 from the second opposed faces 22 (Step 320) along the predefined length 23 of the portion of the wire conductor 10. The laser ablation device 530 may be aimed at or near respective interfaces between the insulative material 14 and the first opposed faces 21, and at or near the respective interfaces between the insulative material 14 and the second opposed faces 22.

The removal of the insulative material 14 from the first opposed faces 21 and the second opposed faces 22 along the predefined length 23 of the portion of the wire conductor 10 (Steps 310, 320) is illustrated with reference to FIG. 3-2.

The removal of the insulative material 14 from the outer surface of the plurality of square edges 24 along the predefined length 23 of the portion of the wire conductor 10 (Step 330) is illustrated with reference to FIG. 3-3. In this manner, an exposed terminal 20 for the insulated conductive lead 10 may be prepared.

Referring now to FIGS. 4-1, 4-2, and 4-3, with continued reference to the process tool setup 500 described with reference to FIG. 5, another embodiment of an ablation process 400 for removing insulative material 14 and shaping an embodiment of the terminal 20 of the wire conductor 10 is depicted.

An end portion of the conductive element 12 is inserted into a fixture 510.

The mechanical ablation device 520 is employed to remove the insulative material 14 from an outer surface of the plurality of square edges 24 along a predefined length 23 of the portion of the wire conductor 10 (Step 410).

The mechanical ablation device 520 is then employed to remove the insulative material 14 from the first opposed faces 21 along the predefined length 23 of the portion of the wire conductor 10 (Step 420). A plurality of the wire conductors 10 are arranged in series.

The laser ablation device 530 is employed to remove the insulative material 14 from the second opposed faces 22 of the plurality of the wire conductors 10 arranged in series along the predefined length 23 of the portion of the wire conductor 10 (Step 430).

Figures 1, 4:
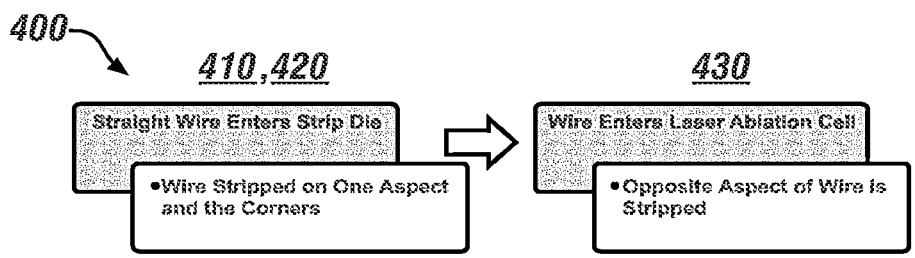
Figures 2, 4:
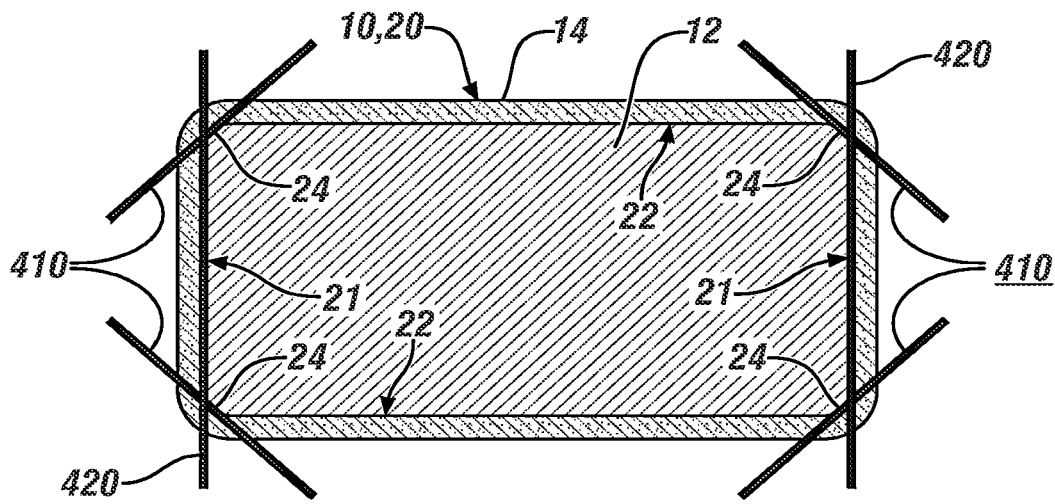
Figures 3, 4:
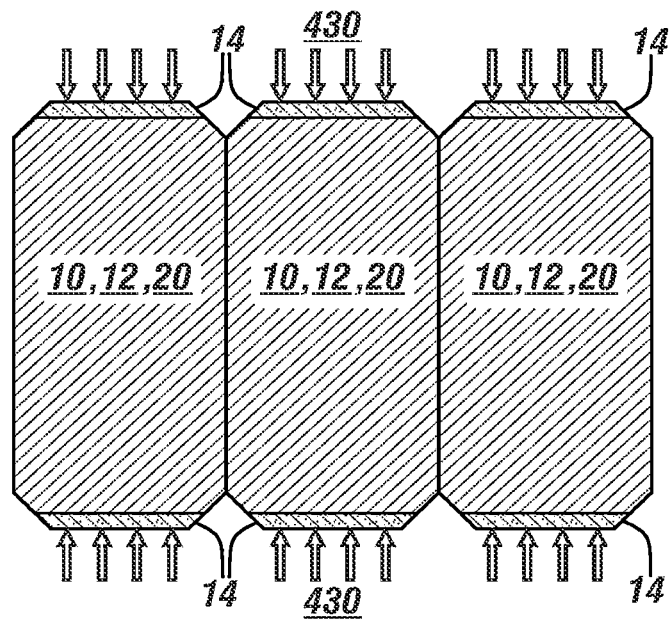

The removal of the insulative material 14 from the outer surface of the plurality of square edges 24 along the predefined length 23 of the portion of the wire conductor 10 (Step 410) and the removal of the insulative material 14 from the first opposed faces 21 along the predefined length 23 of the portion of the wire conductor 10 along the predefined length 23 of the portion of the wire conductor 10 (Step 420) is illustrated with reference to FIG. 4-2.

The removal of the insulative material 14 from the second opposed faces 22 of the plurality of the wire conductors 10 arranged in series along the predefined length 23 of the portion of the wire conductor 10 (Step 430) is illustrated with reference to FIG. 4-3. In this manner, an exposed terminal 20 for the insulated conductive lead 10 may be prepared. The benefits of multiple ablation methods within one process may result in reduced cycle time and increased quality of enamel removal.

The teachings may be described herein in terms of functional and/or logical block components and/or various processing steps. Such block components may be composed of hardware, software, and/or firmware components that have been configured to perform the specified functions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for preparing an exposed terminal for a wire conductor, the method comprising:
    inserting a portion of the wire conductor into a fixture, wherein the wire conductor includes an elongated conductive element encased in an insulative material, wherein the elongated conductive element has a rectangular cross-section including a first pair of opposed faces and a second pair of opposed faces, and wherein a plurality of square edges are disposed at adjacent ones of the first pair of opposed faces and a second pair of opposed faces;
    executing, via a mechanical device, a mechanical ablation process to remove the insulative material from an outer surface of the plurality of square edges disposed at the adjacent ones of the first pair of opposed faces and the second pair of opposed faces along a predefined length of the portion of the wire conductor;
    executing, via a laser tool, a laser ablation process to remove the insulative material from the first pair of opposed faces along the predefined length of the portion of the wire conductor; and
    executing, via the laser tool, the laser ablation process to remove the insulative material from the second pair of opposed faces along the predefined length of the portion of the wire conductor,
    wherein the insulative material is removed from the outer surface of the plurality of square edges, via the mechanical ablation process, and the insulative material is removed from the first pair of opposed faces and the second pair of opposed faces, via the laser ablation process, simultaneously within one process step.

2. The method of claim 1, further comprising straightening the portion of the wire conductor prior to inserting the portion of the wire conductor into the fixture.

3. The method of claim 1, wherein the insulative material comprises an enamel coating.

4. The method of claim 1, wherein the mechanical device is a strip die, and wherein executing, via the mechanical device, the mechanical ablation process comprises executing a strip die operation to remove the insulative material from the outer surface of the plurality of square edges along the predefined length of the portion of the wire conductor.

5. The method of claim 1, wherein the mechanical device is an edge forming tool, and wherein executing, via the mechanical device, the mechanical ablation process comprises operating the edge forming tool to remove the insulative material from the outer surface of the plurality of square edges along the predefined length of the portion of the wire conductor.

6. The method of claim 5, wherein the edge forming tool is a rotatable bevel device; and
    wherein executing, via the mechanical device, the mechanical ablation process further comprises operating the rotatable bevel device at an angle in relation to the plurality of square edges to remove the insulative material from the outer surface of the plurality of square edges along the predefined length of the portion of the wire conductor and to transform the plurality of square edges to beveled edges.

7. The method of claim 5, wherein the edge forming tool is a rotatable chamfer device; and
wherein executing, via the mechanical device, the mechanical ablation process further comprises operating the rotatable chamfer device to remove the insulative material from the outer surface of the plurality of square edges along the predefined length of the portion of the wire conductor and to transform the plurality of square edges to chamfered edges.

8. The method of claim 1, wherein executing, via the laser tool, the laser ablation process to remove the insulative material from the first pair of opposed faces along the predefined length of the portion of the wire conductor comprises focusing the laser tool to operate on the first pair of opposed faces of the elongated conductive element proximal to the insulative material along the predefined length of the portion of the wire conductor.

9. The method of claim 1, wherein executing, via the laser tool, the laser ablation process to remove the insulative material from the second pair of opposed faces along the predefined length of the portion of the wire conductor comprises focusing the laser tool to operate on the second pair of opposed faces of the elongated conductive element proximal to the insulative material along the predefined length of the portion of the wire conductor.

10. A method for preparing a wire conductor, the method comprising:
inserting a portion of the wire conductor into a fixture, wherein the wire conductor is an elongated conductive element encased in an insulative material, and has a rectangular cross-section including a first pair of opposed faces and a second pair of opposed faces, and wherein a plurality of square edges are disposed at adjacent ones of the first pair of opposed faces and a second pair of opposed faces;
executing, via a mechanical device, a mechanical ablation process to remove the insulative material from an outer surface of the plurality of square edges along a predefined length of the portion of the wire conductor;
executing, via the mechanical device, the mechanical ablation process to remove the insulative material from the first pair of opposed faces along the predefined length of the portion of the wire conductor; and
executing, via a laser tool, a laser ablation process to remove the insulative material from the second pair of opposed faces along the predefined length of the portion of the wire conductor,
wherein the insulative material is removed from the outer surface of the plurality of square edges and from the first pair of opposed faces, via the mechanical ablation process, and the insulative material is removed from the second pair of opposed faces, via the laser ablation process, simultaneously within one process step.

11. The method of claim 10, further comprising straightening the portion of the wire conductor prior to inserting the portion of the wire conductor into the fixture.

12. The method of claim 10, wherein the wire conductor comprises an enamel coated conductor.

13. The method of claim 10, wherein the mechanical device is a strip die, and wherein executing, via the mechanical device, the mechanical ablation process comprises executing a strip die operation to remove the insulative material from the outer surface of the plurality of square edges along the predefined length of the portion of the wire conductor.

14. The method of claim 10, wherein the mechanical device is an edge forming tool, and wherein executing, via the mechanical device, the mechanical ablation process comprises operating the edge forming tool to remove the insulative material from the outer surface of the plurality of square edges along the predefined length of the portion of the wire conductor.

15. The method of claim 14, wherein the edge forming tool is a rotatable bevel device; and
wherein executing, via the mechanical device, the mechanical ablation process further comprises operating the rotatable bevel device at an angle in relation to the plurality of square edges to remove the insulative material from the outer surface of the plurality of square edges along the predefined length of the portion of the wire conductor and to transform the plurality of square edges to beveled edges.

16. The method of claim 14, wherein the edge forming tool is a rotatable chamfer device; and
wherein executing, via the mechanical device, the mechanical ablation process further comprises operating the rotatable chamfer device to remove the insulative material from the outer surface of the plurality of square edges along the predefined length of the portion of the wire conductor and to transform the plurality of square edges to chamfered edges.

17. A wire conductor, comprising:
an elongated conductive element encased in enamel;
wherein the elongated conductive element has a rectangular cross-section including a first pair of opposed faces and a second pair of opposed faces;
wherein a plurality of square edges are disposed at adjacent ones of the first pair of opposed faces and a second pair of opposed faces;
wherein a portion of the elongated conductive element is subjected to a mechanical ablation process to remove the enamel from an outer surface of the plurality of square edges along a predefined length of the portion of the elongated conductive element;
wherein a portion of the first pair of opposed faces along the predefined length of the portion of the elongated conductive element is subjected to a laser ablation process to remove the enamel; and wherein a portion of the second pair of opposed faces along the predefined length of the portion of the elongated conductive element is subjected to the laser ablation process to remove the enamel,
wherein the insulative material is removed from the outer surface of the plurality of square edges, via the mechanical ablation process, and the insulative material is removed from the first pair of opposed faces and the second pair of opposed faces, via the laser ablation process, simultaneously within one process step.

18. The wire conductor of claim 17, wherein the elongated conductive element is fabricated from one of copper, a copper alloy, aluminum, or an aluminum alloy.

* * * * *